United States Patent [19]

Kunz

[11] 4,324,344
[45] Apr. 13, 1982

[54] ROTATABLE PRESSURE VESSEL

[76] Inventor: Paul Kunz, D-5419 Döttesfeld, Fed. Rep. of Germany

[21] Appl. No.: 203,560

[22] Filed: Nov. 5, 1980

[30] Foreign Application Priority Data

Nov. 23, 1979 [DE] Fed. Rep. of Germany ....... 2947345
Jun. 13, 1980 [DE] Fed. Rep. of Germany ....... 3022245

[51] Int. Cl.³ .............................................. B65D 43/14
[52] U.S. Cl. .................................... 220/333; 220/314; 220/316; 220/335; 220/211
[58] Field of Search ............... 220/260, 314, 316, 333, 220/211, 335

[56] References Cited

U.S. PATENT DOCUMENTS

| 2,639,601 | 5/1953 | Miller | 220/333 X |
| 3,488,883 | 1/1970 | Clements et al. | 220/333 X |
| 3,765,562 | 10/1973 | Shulz | 220/316 |
| 4,096,968 | 6/1978 | Treiber et al. | 220/314 |
| 4,279,356 | 7/1981 | Amorese et al. | 220/314 |

Primary Examiner—George T. Hall
Attorney, Agent, or Firm—Donald Brown

[57] ABSTRACT

A rotatable pressure vessel has an opening and an internal movable cover therefor attached to a lever which is pivoted to the exterior of the vessel. For closing the cover, there is an actuating element movable to engage the lever, and mounted on a stationary support adjacent the vessel.

13 Claims, 8 Drawing Figures

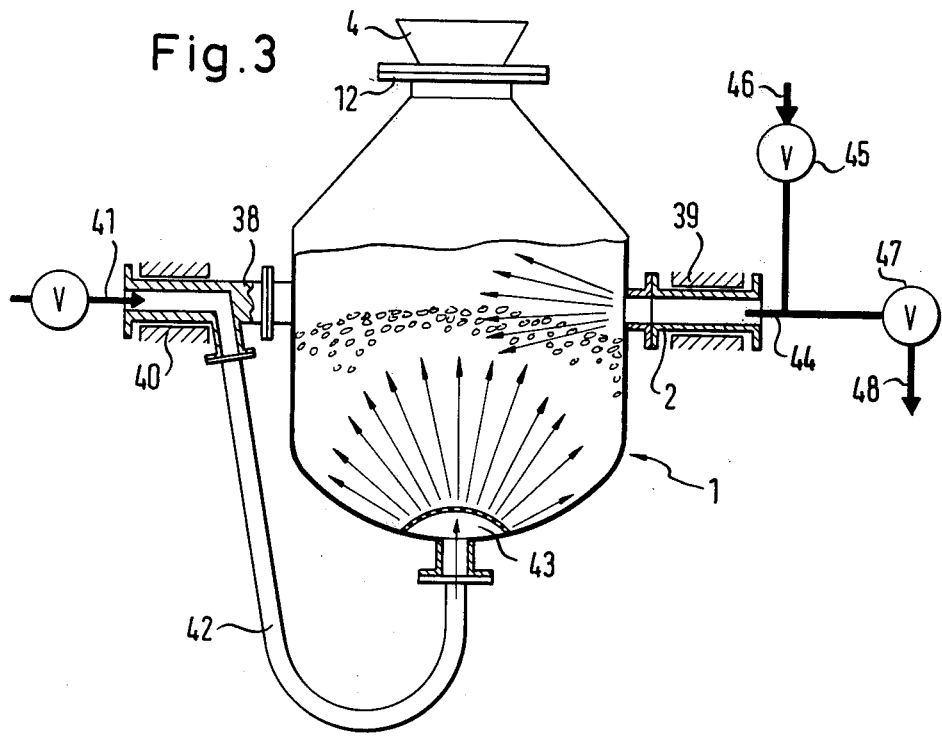
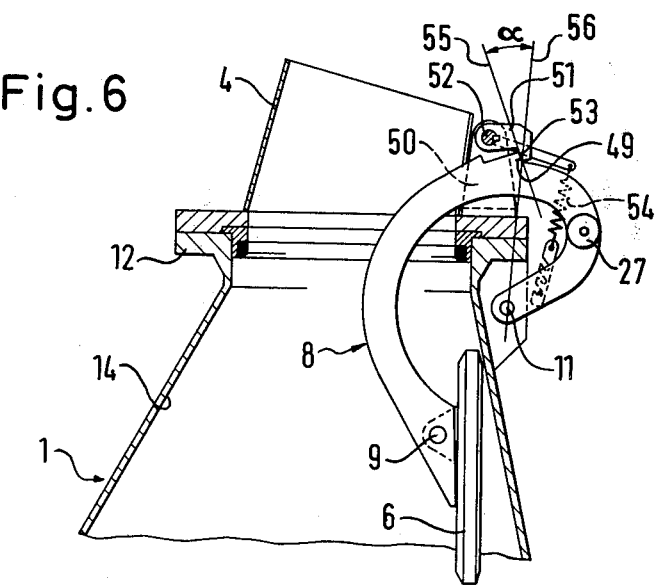

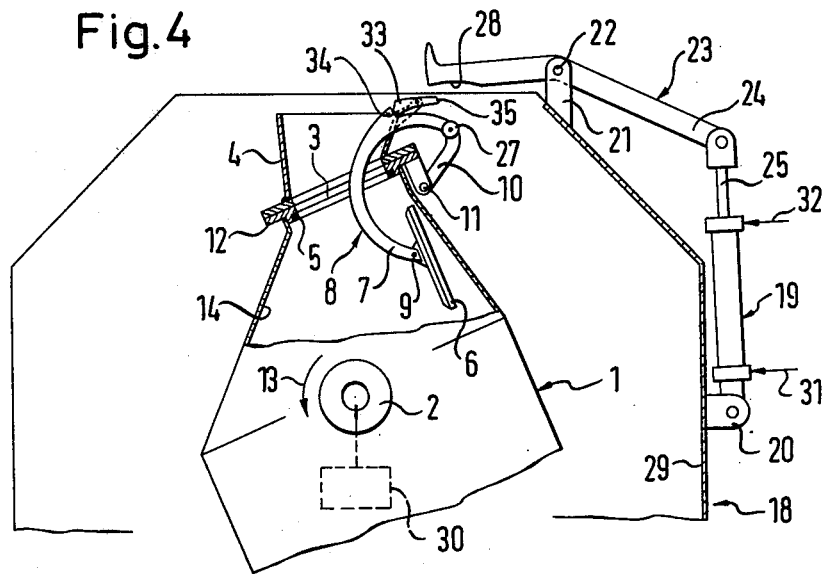
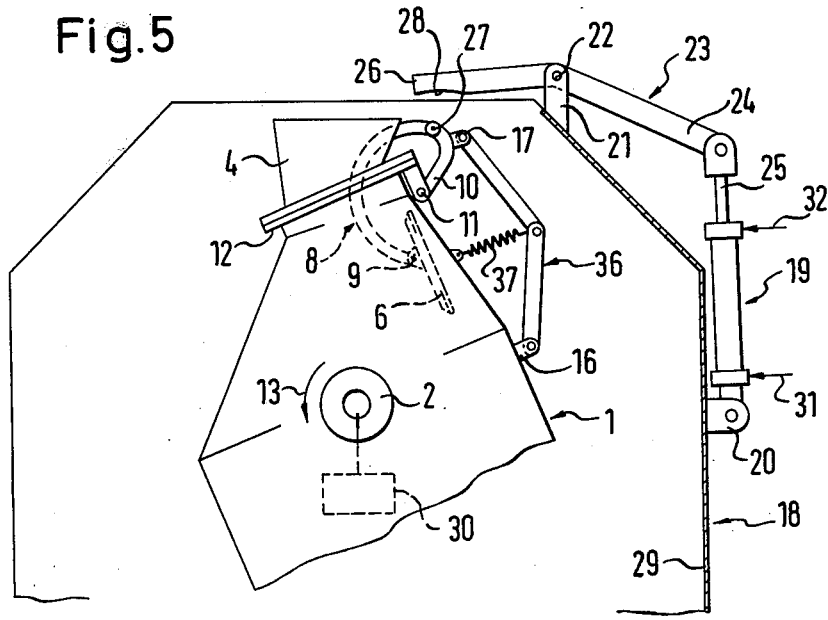

ROTATABLE PRESSURE VESSEL

DESCRIPTION

The invention relates to a rotatably mounted pressure vessel with a feed opening and an internally movable cover to close the opening from inside the vessel.

German laid-open Patent Specification discloses such a vessel with a lever to support the cover and mounted pivotally on the outside of the vessel. The cover is movable by means of a double-acting piston-cylinder device fastened to the outside of the pressure vessel. This means that the supply of pressure medium must turn with rotation of the pressure vessel. In such a construction the cover is forcibly opened by the piston-cylinder device, so that opening is possible before the pressure in the vessel is fully reduced, while a connecting line is necessary between the piston-cylinder device and the stationary parts adjacent the vessel.

The object of this invention is to provide a rotatable pressure vessel with a simple closing mechanism and no need to supply pressure medium thereto.

According to the present invention there is provided a rotatably mounted pressure vessel comprising a feed opening, a cover within said vessel, said cover being movable within said vessel between first and second positions in which respectively, it closes and opens said opening, a lever movably supporting said cover, a pivot for the lever on the outside of the vessel such that when the cover is in said second position the cover extends into said vessel, a stationary support adjacent said vessel and, mounted on said support, an actuating element to move said cover to said first position to close said opening.

With this invention there is no need to provide any permanent connection to vessel, for opening or closing, and in particular no opening or closing device extends to the vessel which it rotates. Also, the closing mechanism is reliable to operate and easy to make.

Preferably said cover is mounted so that, when said pressure vessel is in a predetermined orientation, said cover falls essentially under its own weight from said first to said second position. This has the advantage that there is no real need for a forcibly acting device to open the cover. The cover then opens only if the pressure prevailing in the pressure vessel has diminished to such an extent that the cover can fall into the open position due to its own weight, and it is impossible for the cover to be forcibly opened by mistake when a high pressure prevails.

The pressure vessel of the invention is especially appropriate as a steam skinner or pressure cooker, but its use is not restricted to these applications. In such applications, however, the problem arises that during filling and emptying, the opening and cover can come in contact with the product to be treated. Due to residual moist and sticky product remains, it can happen that the cover sticks somewhat, in the closed state, to the margin of the feed opening. To ensure that no delay occurs when the cover is to open due to its own weight, the pressure vessel has, according to a preferred feature of the invention, an additional actuating device which urges the cover towards the open position, at least when it is in the closed state. This prestressing can be sufficient to overcome the immediate effects of any sticking, as soon as the pressure is relieved within the pressure vessel.

According to another preferred feature of the invention a blocking element is provided which locks the cover in the opened position after opening. It is thus ensured that the open cover cannot fall back by mistake into the closed position when the pressure vessel is turned into an emptying orientation in which the opening is situated at the underside.

Further features and advantages of the invention will be apparent from the following description of exemplary embodiments given with reference to the drawings in which:

FIG. 3 is a partly cutaway front view of the pressure vessel.

FIG. 4 is a partly cutaway view of a pressure vessel with a modified embodiment of the closing device in the opened position.

FIG. 5 is a view of a pressure vessel with a further modified opening and closing device in the opened position.

FIG. 6 is a view of a modified embodiment.

Figure 1:
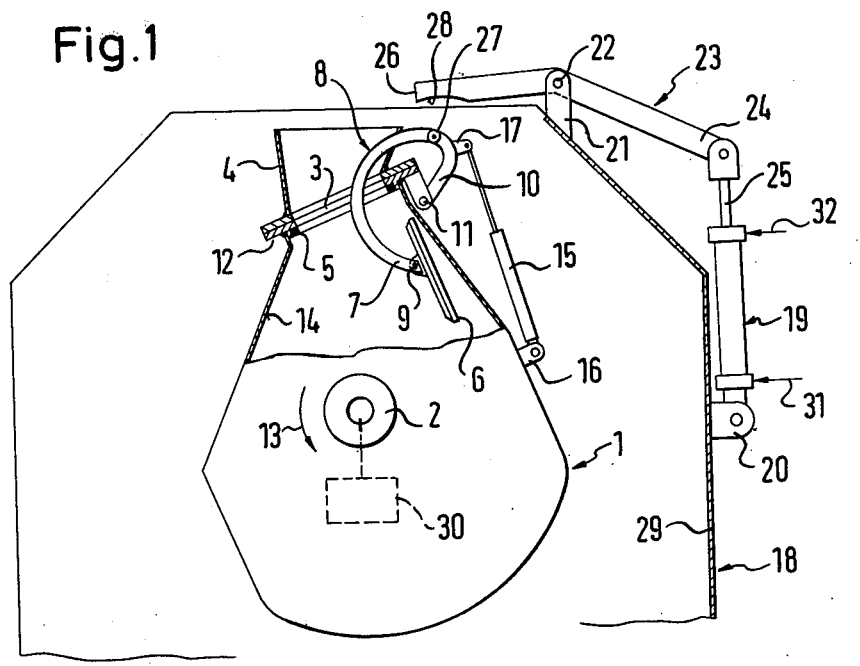
FIG. 1 is a partly cutaway side view of a pressure vessel, in the just opened position, which is mounted turnably in a housing.

The embodiment illustrated in FIGS. 1 and 2 will be described first. The pressure vessel 1 is conventionally mounted rotatably, about a substantially horizontal axis, in bearings, via two laterally flanged hollow shafts 2. The pressure vessel 1 has a feed opening 3 to which a feed funnel 4 is flanged. A gasket 5 is provided conventionally on the inside of the feed opening. A cover 6, which is connected to one end 7 of a lever 8 by means of a joint 9, serves to close the feed opening 3. This lever 8 is connected at its other end 10 to a swivel joint 11 which is connected on the outside to the pressure vessel or to the flange 12 limiting the feed opening 3.

Figure 2:
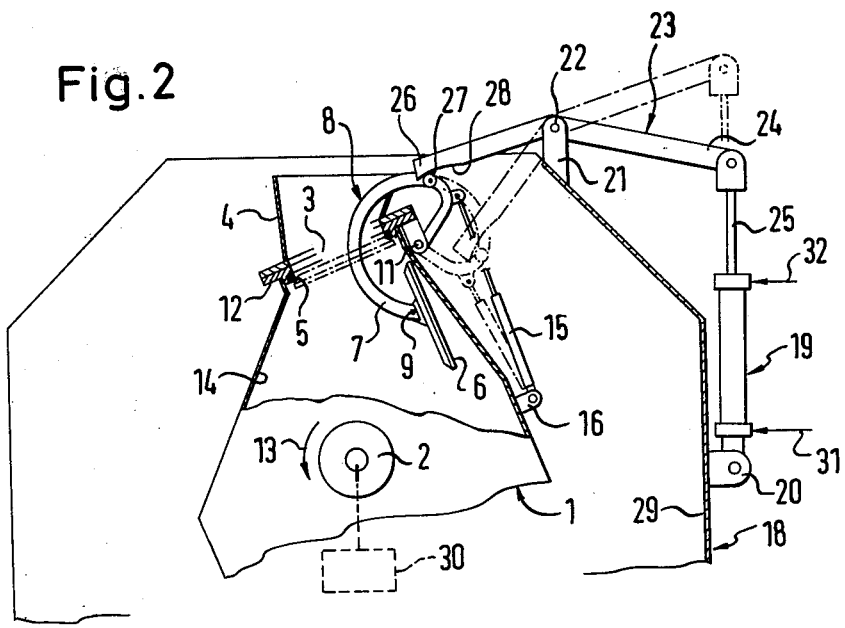
FIG. 2 is a partly cutaway view of the pressure vessel illustrated in FIG. 1, the position at the start of the closing action being shown by unbroken lines and the position at the end of the closing action being shown by broken lines.

The lever 8 is pivotable to and fro about the swivel joint 11 between the two positions shown respectively by broken and unbroken lines in FIG. 2, the cover being open in the position illustrated by unbroken lines and being closed in the position illustrated by broken lines. The lever 8 is curved and the centre point of the curvature lies approximately in the axis of the swivel joint 11. The radius of the curved lever is such that on its inside the lever does not contact the wall of the feed opening and that on its outside it does not scrape along the housing. Furthermore, the radius is such that the cover 6 is offset to the side from the feed opening in the manner illustrated in FIGS. 1 and 2.

To fill it with fruit, the pressure vessel is pivoted to the left in the direction of the arrow 13 until the inclined plane 14 formed by a part of the wall of the pressure vessel lies approximately vertically, or even is moved beyond the vertical so that it serves as a chute for filling the pressure vessel with fruit. The swivel joint 11 and the lever 8 connected thereto are arranged on the side of the pressure vessel lying opposite the inclined plane 14, so that during the filling and emptying of the material to be treated the lever 8 and the cover 6 do not interfere or come in contact with this material.

As may be seen especially in FIG. 1, the cover 6 falls automatically, due to its own weight, into the opened position under the force of gravity when the pressure vessel 1 is in a turning position lying between approximately 11 o'clock and 3 o'clock as viewed on a clock face, in the event that no pressure which holds the cover in the closing position from inside prevails in the pressure vessel. In the embodiment illustrated in FIGS. 1 and 2 there is provided additionally an actuating device in the form of a compression spring 15 which is connected at its one end to a flange 16 connected to the pressure vessel and at its other end to a flange 17 attached to the lever 8. The compression spring 15 is adjusted so that, when the cover is closed, the spring prestresses the lever 8 and consequently the cover 6 into the position shown in FIG. 1, in such a way that any sticking of the cover and cover margin due to product remains is overcome. The prestressing can also be effected in such a way that, when the pressure vessel is turned through 360° in the direction of the arrow 20 against the force of gravity of the cover, the cover remains held in the opened position.

A double-acting piston-cylinder device 19 is fastened, by means of a flange 20, to a stationary frame 18 surrounding the pressure vessel. Furthermore, fastened to the frame is a fork-shaped mounting 21 which holds a shaft 22 arranged substantially parallel to the axis of rotation of the vessel, an element in the form of a double lever 23 being pivotable about this shaft. The lever 23 is connected jointedly at its one end 24 to the end of the piston rod 25 of the piston-cylinder device 19, so that the opposite end 26 of the lever 23 is movable to and fro between the position shown in FIG. 1 and the position shown by broken lines in FIG. 2.

Engagement elements 27 in the form of rollers are attached to the lever 8 on the two transverse sides. The lever 23 has such a length that, when the lever is pressed down, as shown in FIG. 2, from the position shown by unbroken lines into the position shown by broken lines, it engages with the rollers 27 by means of sliding faces 28 provided on the underside of the fork-shaped ends.

A protective wall 29 is provided between the pressure vessel and the double-acting piston-cylinder device 19, so that the piston-cylinder device is protected against steam which escapes when the pressure vessel is opened.

The pressure vessel is, in a known manner, loaded with the pressure medium via the hollow shafts 2 and vented via these hollow shafts. A pressure gauge 30 provided on the hollow shaft generates a signal in dependence on the pressure prevailing on the inside of the pressure vessel.

In operation, after the pressure vessel has been vented the cover 6 moves, due to its own weight, into the opened position shown in FIG. 1 and is held thus by means of the compression spring 15 during the further rotation of the pressure vessel. When the pressure vessel is to be closed, it is moved into the position shown in FIG. 1. Its position can be indicated on a control, not shown, by means of position indicators which can be designed, for example, as proximity switches. After this position is reached, the double-acting piston-cylinder device 19 is loaded via the line 31 with a hydraulic medium so that the lever 23 grips the rollers 27 in the manner illustrated in FIG. 2 and moves the lever 8 into the closed position shown by broken lines. The pressure medium is subsequently supplied to the inside of the pressure vessel so that the cover is held in the closed position by means of the prevailing internal pressure. As soon as the pressure gauge 30 indicates a predetermined internal pressure which holds the cover in the closed position, the piston-cylinder device 19 is loaded with pressure medium via a line 32 and the line 31 is vented, the device 19 being moved back into the starting position shown in FIG. 1. The closed pressure vessel can subsequently rotate.

To ensure that the cover 6 can sit as centrally as possible on the gasket 5, the lever 8 and the cover 6 are connected to one another by means of a joint 9.

The embodiment illustrated in FIG. 4 is identical in respect of the construction of the pressure vessel, the lever 8 and the piston-cylinder device 19 closing it together with the lever 23. For the sake of simplification, the corresponding parts are designated by the same reference numerals. The embodiment illustrated in FIG. 4 differs from the first embodiment in that the cover is not held in the opened position by a compression spring 15, but a blocking element, namely a pawl 33, connected to the pressure vessel is provided, which pawl is mounted pivotably about an axis of rotation 34 arranged substantially parallel to the axis of rotation of the pressure vessel. The pawl has such a form that, when the pressure vessel is in the position in which the cover falls into the opened position due to its own weight, the pawl pivots due to its own weight towards the lever 8, into the position shown in FIG. 4, and engages with a notch 34 of the lever, thereby causing the cover to be locked in the opened position when the pressure vessel turns in the direction of the arrow 13 in all its rotational positions. The free end 35 of the pawl has such a length that in the closing action corresponding to the illustration of FIG. 2 the lever 23, by means of its fork-shaped end, first pushes the pawl out of the catching position and then engages with the rollers 27 and presses the lever 8 down so that the cover assumes the closed position.

The embodiment illustrated in FIG. 5 differs from the embodiment illustrated in FIG. 2 only in that a toggle-lever linkage 36, which is prestressed into an elongated position by a tension spring 37, is used instead of the compression spring 15. The tension spring has such a tension that without pressure on the inside of the pressure vessel the cover 6 is held in the opened position independently of the rotational position of the pressure vessel.

Closing is effected in the same way as in the embodiment described with reference to FIGS. 1 and 2. In principle, the toggle-lever linkage can be designed in such a way that it is fully elongated in the opened position, so that a lock is obtained independently of the tension spring 37, the lock being released due to the fact that the lever 23 is so designed that it first acts on the toggle-lever linkage so as to move this out of the elongated position into the angled position, and subsequently engages with the rollers 27 and closes the cover as described above.

The embodiment illustrated in FIG. 6 differs from that previously illustrated in that it possesses a modified construction of the mechanism for locking the cover 6 in its opened position. A pawl 51 attached to a pillow block 50 connected to the pressure vessel is pivotable about an axle 52 in such a way that the pawl is directed towards the rollers 27, viewed from the axle 52. The lever 8 has, on its surface, notch-like depressions with engagement faces 49. The plane of the engagement face 49 which is indicated by the extended line 55 is inclined to the imaginary plane 56 passing through the axis of the swivel joint 11 and the base of the engagement face 49, by the angle α. The locking face 53, of the pawl 51, which interacts with the engagement face 49 is inclined so that the locking face 53 and the engagement face 49 are parallel to one another when the pawl engages with the engagement face in the manner illustrated in FIG. 6. The pawl is prestressed into the locking position by means of a spring 54 which acts thereon. As may be seen in FIG. 6, due to the friction between the locking face 43 and engagement face 49, which is further increased as a result of the adjustable force of the spring 54, the pawl is held in the locking position until the frictional force is overcome because of the engagement of the lever 23 on the rollers 27 and the cover is moved into its closed position. The angle α and the corresponding force of the spring 54 are selected so that the cover 6 is held in the opened position in every rotational position of the pressure vessel and cannot move automatically into the closing position due to its own weight, but also, on the other hand, so that the connection is released when the cover is closed by means of the lever. The especial advantage of this embodiment consists in that it is possible to lock the cover 6 in the opened position by means of the pawl 51 without the need for direct action of the lever 23 on the pawl in order to close the cover.

As can best be seen from FIG. 3, the pressure vessel is mounted rotatably in bearings 39, 40 via shafts 2, 38 connected to pipe connections. The shaft 38 accommodates a steam supply line 40, not rotating therewith, which is mounted within the shaft 38 in a plain bearing, not shown, and which is sealed by means of a gland or retaining ring. From the hollow shaft 38 a high-pressure line 42, rotating with the pressure vessel, leads to a stream outlet opening 43 provided in the bottom region of the pressure vessel 1. The other hollow shaft 2 is connected to a stationary line 44, not rotating therewith, via a plane bearing which is not shown, the sealing being effected again in a known manner, for example by means of a gland or retaining ring. The line 44 is connectable, in dependence on a control not show, via a valve 45 to a steam supply line 46 or via a valve 47 to a venting line 48. Since the mechanism actuating the cover does not rotate with the pressure vessel but is stationary, and since the two shafts 2 and 38 are therefore not required for supplying the actuating medium to the piston-cylinder device 19, it is possible to use the two shafts 2 and 38 for supplying the pressure medium in the above-described way, thereby achieving a considerable advantage. In the embodiment shown in FIGS. 7 and 8, the pressure vessel is supported and constructed just as in the preceeding embodiments. The pressure vessel 1 is closed by cover 6, moved by lever 8 which is supported and swivel joint 11 which, in this embodiment, is supported in a supporting flange 57 secured on the pressure vessel, in a manner best seen from FIG. 8. The swivel joint 11 is formed as a shaft 58 rigidly secured on lever 8 and supported in two arms 59, 60 rigidly connected with flange 57. A gear wheel 61 is mounted on one end of shaft 58. A second gear wheel 62 secured on a shaft 63 is in engagement with gear wheel 61. Shaft 63 is mounted in bearings on arm 60 and a further arm 64. A lever 65 is mounted on the end of shaft 63 opposite the pressure vessel. The length of lever 65 exceeds the distance between shaft 63 and the diameter 66 of the outermost portions of the pressure vessel indicated in interrupted lines in FIG. 7, but the length of lever 65 is less than the smallest distance of shaft 63 from those portions of frame 18 lying above the orbit of lever 65. In a manner shown in FIGS. 7 and 8, lever 65 extends substantially normally with respect to the rotating axis of the pressure vessel 1.

Figure 7:
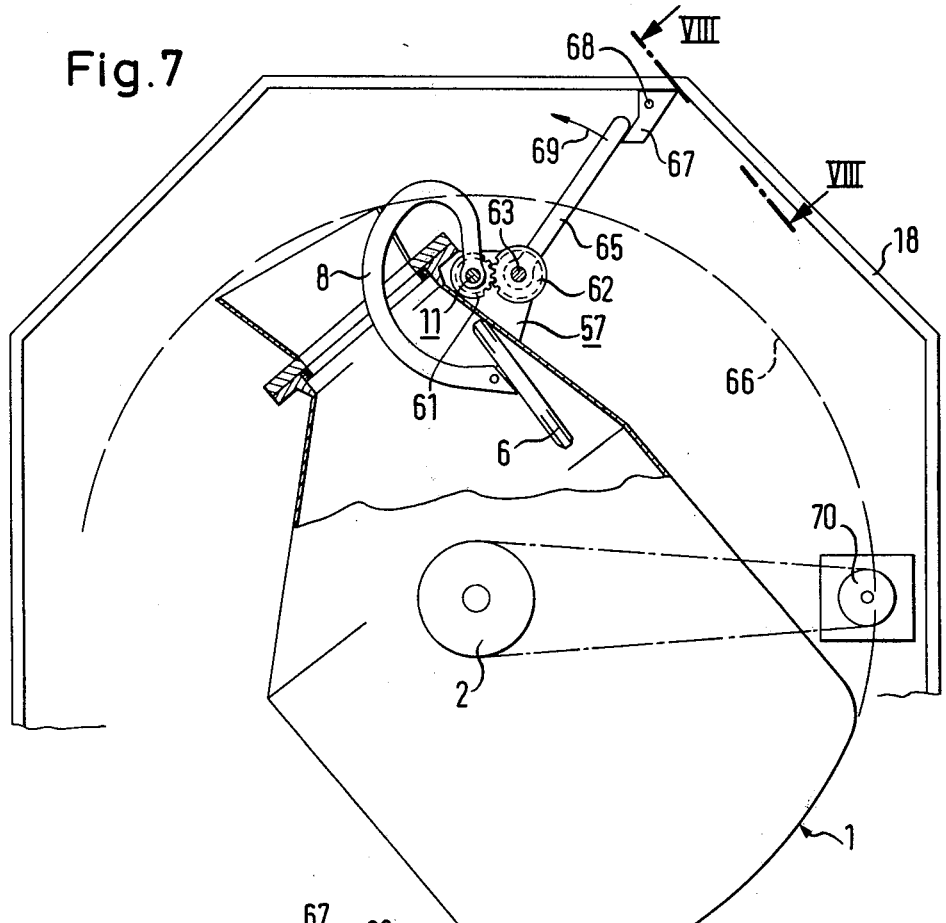
FIG. 7 is a sectional view of a further embodiment along line VII—VII in FIG. 8.

An abutment pawl 67 is provided on frame 18 extending in the orbit of lever 65 and mounted on frame 18 via a shaft 68 connected with frame 18, in such a manner that such abutment pawl 67 may be pivoted away in a direction indicated by arrow 69, whereas, in a direction opposite to arrow 69, pawl 67 rests on the frame 18 through its base in the manner shown in FIG. 7 to form a rigid abutment for lever 65.

The abutment pawl 67 is of such length that, in the position shown in FIG. 7 and upon clockwise rotation of the pressure vessel, the pawl engages lever 65 extending beyond diameter 66. Upon counter-clockwise rotation of the pressure vessel, however, lever 65 will pivot the abutment pawl 67 in the direction of arrow 69 about shaft 68 moving pawl 67 away from the orbit of lever 65 and returning by gravity into its position shown in FIG. 7 when lever 65 is moved further.

Operation of the device is as follows:

The pressure vessel 1 is filled while being in the position shown in FIG. 7. The filled pressure vessel is rotated in clockwise direction, and lever 65 extending beyond diameter 66 will engage the abutment pawl 67 and will be urged thereby in the direction of arrow 69 to move the cover in its closed position through shaft 63, engaging gears 62, 61, shaft 58 and lever 8. The ratio of gears 61 and 62 is selected to provide a rotating movement through the engagement of lever 65 and pawl 67 which is just sufficient to move the cover from its shown open position into its closed position.

Rotation of the pressure vessel 1 is stopped under control of a suitably arranged micro switch or sensor as soon as the cover is in its closed position. Subsequently, the pressure vessel is moved in a counter-clockwise direction in accordance with the direction of arrow 69. After closing of the cover, the pressure vessel is filled with steam, and the pressure within the pressure vessel will maintain the cover in its closed position. As the abutment pawl 67 may be pivoted away on its shaft 68, the movement of the pressure vessel will not be hindered by the abutment. At the end of the processing, e.g. peeling of fruit, the pressure within the pressure vessel is released, and by turning the pressure vessel into a position in which its feed opening 3 is directed upwardly, as shown in FIG. 7, the cover 6 will return in its open position through gravity, and lever 65 will return in its position shown in FIG. 7.

A friction clutch (not shown) is provided between motor drive 70 and the shaft 2 of the pressure vessel. The friction clutch will prevent the cover from being forced in case of jamming or sticking upon engagement of lever 65 and pawl 67, in which case the clutch would be overdriven.

For maintaining cover 6 in its opened position blocking or biasing means may be provided just as with the preceeding embodiments.

Figure 8:
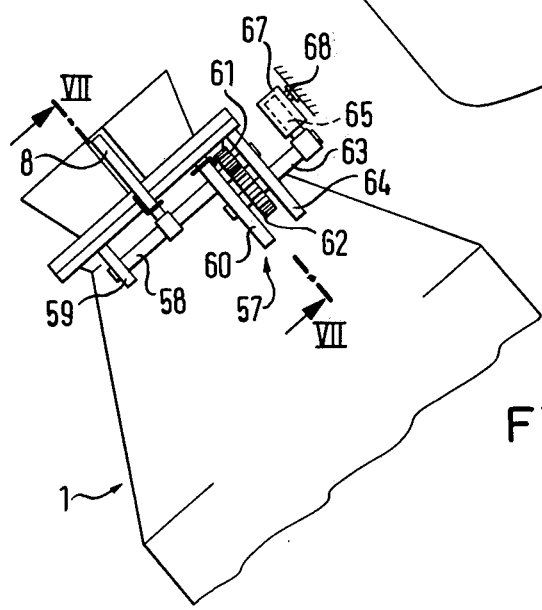
FIG. 8 is a side view of the embodiment shown in FIG. 7.

The embodiment disclosed with reference to FIGS. 7 and 8 provides opening and closing of the pressure vessel without any supply of pressure medium. Moreover, this embodiment provides a very simple and reliable opening and closing device for a pressure vessel of the kind disclosed.

The pressure vessel is preferably, though not exclusively, used as a steam peeler or pressure cooker.

I claim:

1. A rotatably mounted pressure vessel comprising a feed opening, a cover within said vessel, said cover being movable within said vessel between first and second positions in which, respectively, it closes and opens said opening, a lever movably supporting said cover, a pivot for the lever on the outside of the vessel such that when the cover is in said second position the lever extends into said vessel, a stationary support adjacent said vessel and, mounted on said support, an actuating element to move said cover to said first position to close said opening.

2. A pressure vessel as claimed in claim 1, wherein said cover is mounted so that, when said pressure vessel is in a predetermined orientation, said cover falls essentially under its own weight from said first to said second position.

3. A pressure vessel as claimed in claim 1, wherein said actuating element is effective to engage said lever.

4. A pressure vessel as claimed in claim 2 and further comprising means acting on said lever to urge said cover toward said second position.

5. A pressure vessel as claimed in claim 1 and further comprising a blocking element effective to lock said cover in said second position.

6. A pressure vessel as claimed in claim 5, wherein said actuating element is effective to release said blocking element upon movement of said cover from said second position.

7. A pressure vessel as claimed in claim 5, wherein said blocking element comprises a pawl positioned so as to adopt a locking position under gravity when said vessel is in a predetermined orientation and said cover is moved to said second position.

8. A pressure vessel as claimed in claim 7, and including at least one engagement face on said lever, for engagement by said pawl, said face forming an angle of more than 90° with the direction of movement of the lever where said face is provided.

9. A pressure vessel as claimed in claim 3 including two laterally arranged engagement elements on said lever and a fork-shaped end to said actuating element, said fork-shaped end being engageable with said elements to move said cover to said second position.

10. A pressure vessel as claimed in claim 1 and further comprising a hydraulic device to move said actuating element.

11. A pressure vessel as claimed in claim 1 and comprising a pivoting connection between said cover and said lever.

12. A pressure vessel as claimed in claim 1, wherein said actuating element includes first gear means rigidly connected with said lever to be rotated about said pivot, second gear means in driving engagement with said first gear means, lever means mounted to rotate said second gear means upon rotation of said pressure vessel and abutment means mounted on said stationary support to engage said lever means upon rotation of said pressure vessel.

13. The pressure vessel of claim 12, wherein said abutment means is pivotably mounted on said stationary support to be pivoted away by engagement with said lever means upon rotation of said pressure vessel in a predetermined direction and to block the moving path of said lever means upon rotation of said pressure vessel in a direction opposite to said predetermined direction.

* * * * *